US007971346B2

(12) United States Patent
Hösel et al.

(10) Patent No.: US 7,971,346 B2

(45) Date of Patent: Jul. 5, 2011

(54) APPLICATOR FOR ELECTRICAL OR ELECTRONIC COMPONENTS

(75) Inventors: Markus Hösel, Mühlheim (DE); Thomas Walther, Offenbach (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 314 days.

(21) Appl. No.: 11/977,924

(22) Filed: Oct. 26, 2007

(65) Prior Publication Data

US 2008/0149265 A1 Jun. 26, 2008

(30) Foreign Application Priority Data

Oct. 28, 2006 (DE) ........................ 10 2006 050 964

(51) Int. Cl.
*B23P 19/00* (2006.01)

(52) U.S. Cl. ............. 29/743; 29/564.6; 29/721; 29/740; 29/759; 156/361

(58) Field of Classification Search .................... 29/842, 29/564.6, 710, 712, 721, 740, 741, 743, 759; 156/235, 239, 249, 290, 301, 302, 361
See application file for complete search history.

(56) References Cited

U.S. PATENT DOCUMENTS

| | | | | |
|---|---|---|---|---|
| 5,495,661 | A * | 3/1996 | Gromer et al. | 29/740 |
| 5,916,513 | A * | 6/1999 | Mangold et al. | 29/25.01 |
| 6,280,544 | B1 | 8/2001 | Fox et al. | |
| 6,972,394 | B2 * | 12/2005 | Brod et al. | 219/121.85 |
| 7,623,034 | B2 * | 11/2009 | Ferguson et al. | 340/572.1 |
| 2004/0036041 | A1 | 2/2004 | Hoehn | |

FOREIGN PATENT DOCUMENTS

| | | |
|---|---|---|
| DE | 195 00 925 | 7/1996 |
| DE | 10 2005 006 978 | 6/2006 |
| WO | WO 2005/013179 | 2/2005 |
| WO | WO 2005/078648 | 8/2005 |

* cited by examiner

*Primary Examiner* — Thiem Phan

(74) *Attorney, Agent, or Firm* — Cohen Pontani Lieberman & Pavane LLP

(57) ABSTRACT

Stock having printed circuits thereon is conveyed in a transport plane by a conveying device, and electronic components carried by a transfer belt are transferred to the stock under pressure exerted by the belt. The electronic components are transferred to the belt by a feed device individually in such a way that the electronic components are accurately positioned on the stock by the transfer device.

11 Claims, 5 Drawing Sheets

APPLICATOR FOR ELECTRICAL OR ELECTRONIC COMPONENTS

BACKGROUND OF THE INVENTION

1. Field of the Invention

The invention pertains to a process for applying electronic components to a printed product and to a device for applying electronic components, which serves preferably to integrate electronic or electrical components into printed products.

2. Description of the Related Art

The market is demanding to an increasing extent that printed products be provided with expanded functionalities which allow interaction between the printed product and the consumer or interaction between the printed product and automatic data acquisition devices. An example is the printed barcode, which carries information about the product and can be read by a suitable reader. The disadvantages of the printed barcode are that there must be visual contact between the barcode and the reader and that the data code is limited and cannot be dynamically modified. RFID (radio-frequency identification device) chips, however, offer the possibility of dynamic data detection and can also be read without visual contact.

A process for producing RFID transponders at favorable cost is known from various patent publications, such as WO 2005/078648 A, according to which a plurality of antennas is printed on a sheet with several panels, after which the sheet is cut into individual panels in a processing step such as punching downstream from the printing process. The antennas on the individual panels are then each provided with a chip or with a chip on an auxiliary carrier (or "strap") in a separate device.

A typical applicator system in combination with print applications is described in WO 2005/013179 A. The device is used to print on at least one continuously traveling web, where the device serves at least one device for the continuous transfer of individual transponders or parts of transponders based on the functional principle of radio frequency identification. The disadvantages of this solution are that the components are transferred to a continuous web and that the transponders or parts of the transponders are applied during the printing process. Most packages, however, are fabricated out of sturdy material to protect the product and to ensure safe storage, but such material is difficult to roll up. Normally, therefore, such materials are processed in the form of sheets. Another disadvantage of an applicator system which works in cooperation with a continuous web, furthermore, is that in most cases several panels are printed next to each other. It is therefore necessary in this case to provide several applicator systems and to set them up next to each other. The number of applicators required, furthermore, can also change as a function of the size of the panels.

U.S. Pat. No. 6,280,544 B1 discloses a combination of printing and RF tag application (radio frequency antenna and chip). A process for producing a label is described, according to which an RF tag, consisting of an antenna and a chip, is applied to the rear surface of a printed label. The process does not involve the application of a chip to a printed antenna; instead, a tag, which consists of an antenna and a chip, is applied to the rear surface of the label. This means that the cost advantages of printing the antenna directly on the substrate cannot be realized. In addition, this solution is based on a continuous production process, which is difficult to transfer to a process for producing folding boxes.

DE 10 2005 006 978 B3 describes an applicator system in which the semiconductor elements or interposers are held on a flexible, continuous carrier belt. The semiconductor element or the interposer is fixed to the carrier belt by heating elements. An endless belt travels around the heating elements. Here, too, the application of semiconductor elements on an endless carrier belt is described; the use of the process for individual products is not described.

US 2004/0036041 discloses a device and a process for the production of flip-chip modules. First, an adhesive is applied to a continuous carrier belt. Then a chip is positioned on the belt by an automatic pick-and-place machine. A synchronized pressing tool is used next to exert pressure on the chip. Simultaneously, additional energy such as that of radiation can be applied to accelerate the curing of the adhesive. This patent, too, speaks of a continuous carrier belt, not of application to individual printed products. Another disadvantage of the selected application is that only a limited processing speed can be achieved with a pick-and-place machine, and this limited speed is not sufficient for the throughput of a folding box manufacturer.

SUMMARY OF THE INVENTION

The task of the invention is therefore to define an application device which applies electrical and/or electronic components to a printing blank or sheet reliably and with satisfactory accuracy.

According to the inventive solution, an electronic component such as a strap, an interposer, or a microchip module is laid by a feed device on an endless traveling transfer belt and transported in the conveying direction of the transport belt. After the transfer belt has traveled around a guide roller, the component is set down onto the stock. The stock is then transported by a conveyor device, which operates either continuously or at intervals, and the transfer belt attaches the strap, interposer, or microchip module to the stock by the use of pressure.

The electronic component is placed on the transfer belt under open-loop or closed-loop control in such a way that that the electronic component will lie correctly and accurately within narrow tolerances on the antenna terminal pads of a conductive structure printed on the substrate. The position of the aligned blank on the conveyor device can be detected by position-detection sensors, and the transfer of the electronic component lying on the transfer belt can be controlled on the basis of the signals from the sensors. Triangulation sensors, capacitive sensors, or cameras are suitable sensors.

The invention makes it possible for the electrical or electronic component on an auxiliary carrier (strap or interposer) to be pressed for an extended period of time onto the individual stock. Thus the disadvantage associated with the direct application of the electronic component to a stock, e.g., by a pick-and-place machine, is avoided. In such cases the stock must be held still for the time required for the component to be attached properly, which makes continuous application impossible. As a result, the throughput and the quality of the application process are impaired.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PREFERRED EMBODIMENTS

Figure 1:
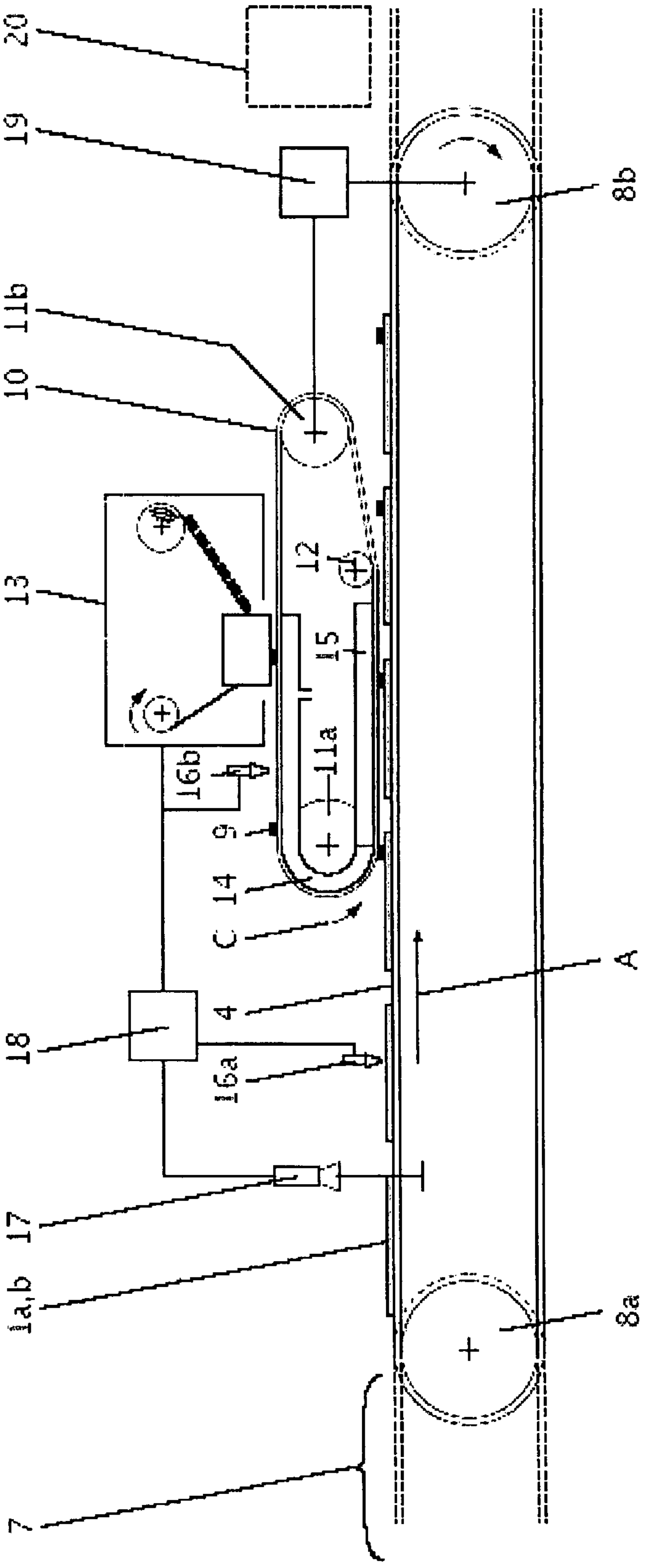
FIG. 1 shows a side elevation of a first embodiment of an inventive device.
Figure 5:
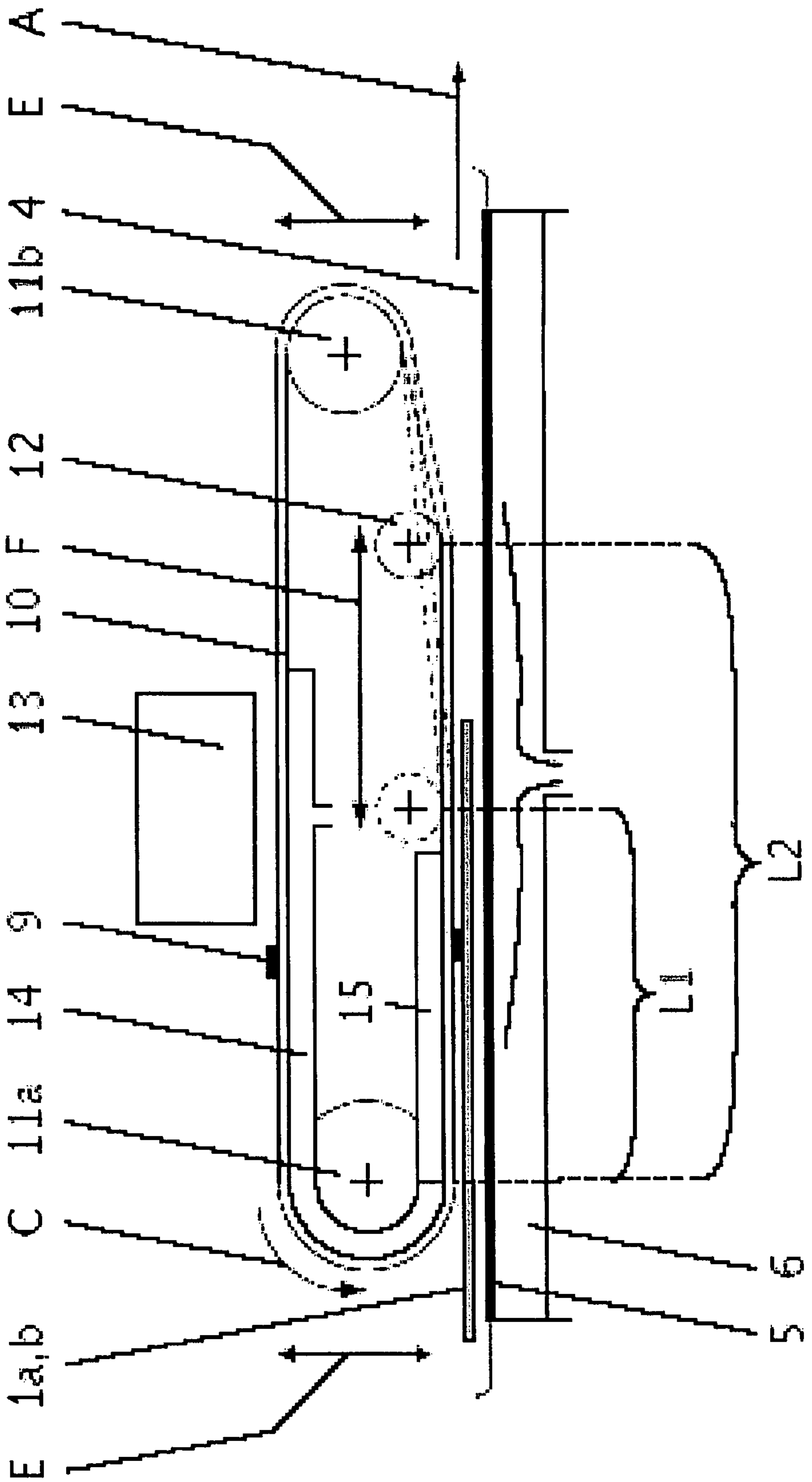
FIG. 5 shows a side elevation of a second embodiment of an inventive device.

Referring to FIG. 5, a conveyor device consisting of a conveyor table 5 and conveyor belts 4 is provided. Referring to FIG. 1, a feed device 7 delivers stock 1*a*, 1*b* in the form of, for example, layouts for folding boxes to the conveyor device 4, 5 in the transport direction A. These layouts are usually provided with an irregular contour. It is therefore advisable for the conveyor belts 4 to be designed as suction belts and for the conveyor table 5 to be a suction belt table.

In particular, the stock 1*a*, 1*b* consists of layouts on which electronic circuits have been printed. Circuits suitable for printing include antennas 2 and antenna pads 3.

After the stock 1*a*, 1*b* has been provided with its electronic components 9, it is removed from the conveyor device 4, 5 in an output device 20 and delivered. The stock can be laid in flat horizontal stacks or set up vertically on edge. It must be kept in mind that, because of the printed circuits 2, 3 and the electronic components 9 on the stock 1*a*, 1*b*, the individual layouts cannot always be stacked flat without additional effort. That is, they either have to be laid on top of each other with alternating orientations, stacked in a loose pile, or stood on edge, whichever is best. Immediate further processing in a packaging machine is also possible.

The arrangement can be connected directly to a production system consisting of a printing press, which produces the printed circuits 2, 3, e.g., a sheet-fed offset press, and a punching device. The punching device can be an in-line unit of the printing press, in which case the printing press will be followed downstream by a sorting device for the individual copies of the printed stock 1*a*, 1*b*.

The electronic components 9 in the form of straps, interposers, or microchip modules are laid by a strap dispenser or a by a feed device 13 onto an endless transfer belt 10 traveling around at least two guide rollers 11*a*, 11*b*. The components 9 are thus transported in the transport direction C of the transfer belt 10, and after the transfer belt 10 has carried them around the guide roller 11*a*, they are transferred to the stock 1*a*, 1*b*. Finally, the electronic components 9 are fixed to the stock 1*a*, 1*b* by the pressure exerted on them by the transfer belt 10.

The stock 1*a*, 1*b* preferably consists of blanks for folding boxes, for example. The stock 1*a*, 1*b* is transported either continuously or at intervals by a conveyor device, which has one or more transport belts 4, which are also guided around guide rollers 8*a*, 8*b* and along a conveyor table 5. The conveyor table 5 can contain a vacuum box 6, so that the stock 1*a*, 1*b* can be held pneumatically during transport on the transport belts 4, which are designed in this case as suction belts.

The stock 1*a*, 1*b* is sent to the conveyor belts 4 by a feed and aligning device 7 so that the blanks all have the same orientation.

At the opposite end of the conveyor device with respect to the transport direction A, an output or delivery device 20 is provided, which can stack the stock provided with the electronic components 9. It must be remembered that, because of the presence of the electronic components 9, the orientation of the individual blanks must be offset from each other in alternating fashion.

Figure 2:
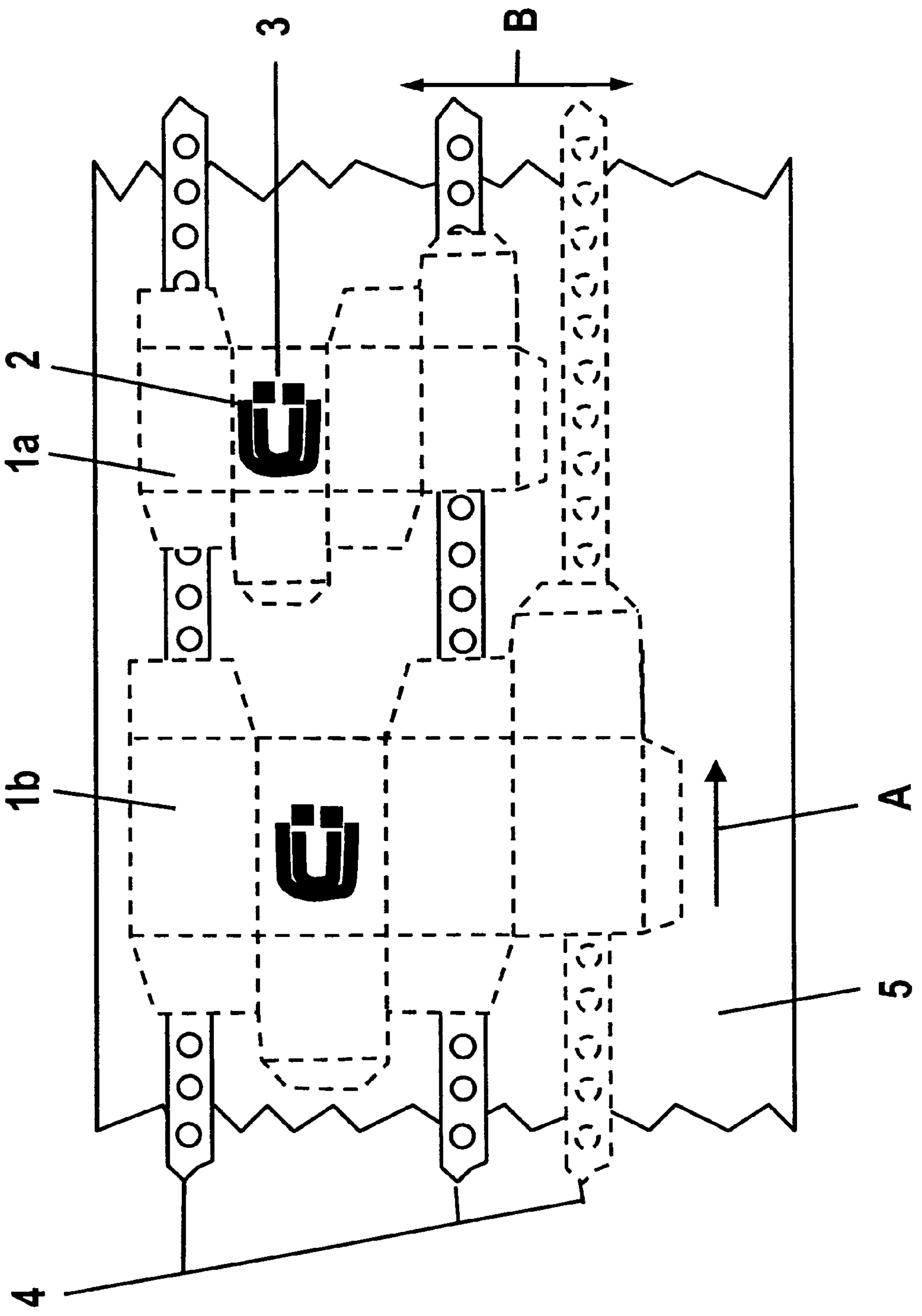
FIG. 2 shows a layout of two different sizes with applied elements.

The electronic components 9 are placed on the transfer belt 10 under open-loop or closed-loop control in such a way that they arrive correctly oriented and accurately aligned within narrow tolerances on the antenna terminal pads 3 of the antenna 2 or on some other conductive surfaces which have been printed on the stock 1*a*, 1*b* (see FIG. 2). The position of the aligned blank 1*a*, 1*b* on the conveyor device 4, 5 can be detected by a position sensor 17, and the signals obtained from the sensor can be used to control the placement of the electronic components 9. Any suitable sensor can be used as the position sensor 17 as long as it can detect the position of the blank 1*a*, 1*b* on the conveyor device 4. Triangulation sensors, capacitive sensors, or cameras could be used as sensors.

The electronic components 9 can also be fixed to the transfer belt 10 by pneumatic means. The pneumatic vacuum can be applied by a vacuum chamber 14, which holds the electronic components 9 on the transfer belt 10 until first contact or shortly before first contact with the stock 1*a*, 1*b* on the transfer belt 10. The vacuum chamber 14 can be connected to a blast air chamber 15, which is supplied with blast air to separate the electronic components 9 more effectively from the transfer belt 10. The blast air of the blast air chamber 15 can be heated by a heating device to accelerate the curing of the bond between the electronic component 9 and the printed antenna 2 or the printed terminal pads 3 of the antenna 2.

An adhesive applicator device 16*b* can be used to apply an adhesion promotor to the electronic components 9 present on the transfer belt 10. The type of adhesion promotor is not important with respect to the invention. Anisotropic adhesives are expressly included as suitable adhesion promotors. Alternatively, an adhesive applicator device 16*a* can be provided to apply an adhesion promotor to the stock 1*a*, 1*b*, and then the electronic components 9 can be pressed by the transfer belt 10 against the adhesive present on the stock 1*a*, 1*b*.

The application of the adhesion promotor by the adhesive applicator device 16*a* to the stock 1*a*, 1*b* is synchronized by the cooperation between a control unit 18, which evaluates signals from the position sensor 17, and sends commands to the adhesive dispenser. The position sensor 17 determines the position of the stock 1*a*, 1*b*, so that, in conjunction with the forward transport movement of the transfer belt 10, the time at which the adhesion promotor is applied can be determined by the control unit 18.

If the adhesive applicator device 16*b* is used to supply the electronic components 9 with an adhesion promotor, the control unit 18 for signal evaluation for dispensers and adhesive will be connected to the control unit of the feed device 13 or to that of the transfer belt 10.

Alternatively, the electronic components 9 on the transfer belt 10 can be provided with solder (in the form of a "bump") by an adhesive applicator device 16*b*. This same also applies to the stock 1*a*, 1*b* on the conveyor device 4. In this case, the stock will be provided with solder by the adhesive applicator device 16*a*.

The movement of the transfer belt 10 is synchronized with that of the conveyor device 4 by the synchronization device

19. This can be a mechanical or an electronic device. Ideally, the surface velocity of the transfer belt 10 and that of the conveyor device 4, 5 are detected by a suitable sensor system, so that differences in the surface velocity which result from different stretching ratios can be compensated via the synchronization device 19, so that the transfer belt 10 and the conveyor device 4, 5 travel with the same surface velocity. An advantageous elaboration of the inventive solution consists in detecting the temperature of the transfer belt 10 and that of the conveyor device 4, 5 at one or more points along the transport route. By tempering one or both guide rollers 11*a*, 11*b* of the transfer belt 10 and one or both guide rollers 8*a*, 8*b* of the conveyor device 4, 5, the temperature can be kept constant by comparing the measured temperature with a nominal value, and if there is a deviation from the nominal value, the tempering device can be used to adjust the temperature until the nominal value is reached again. If the temperature of the belts is kept constant, it may be possible under certain conditions to omit the devices required to detect the surface velocity.

In an inventive elaboration (see FIG. 5), the length of a pressing section L1, L2 of the transfer belt 10 can be adjusted in the direction F by one or more adjustable guide rollers 12. Ideally, the entire transfer belt 10 can also be adjusted in the height direction E by means of an adjusting device, so that the pressure exerted by the transfer belt 10 on the stock 1*a*, 1*b* carrying the applied electronic components 9 can also be kept constant within narrow limits even when substrates of different thicknesses are to be processed.

Figure 3:
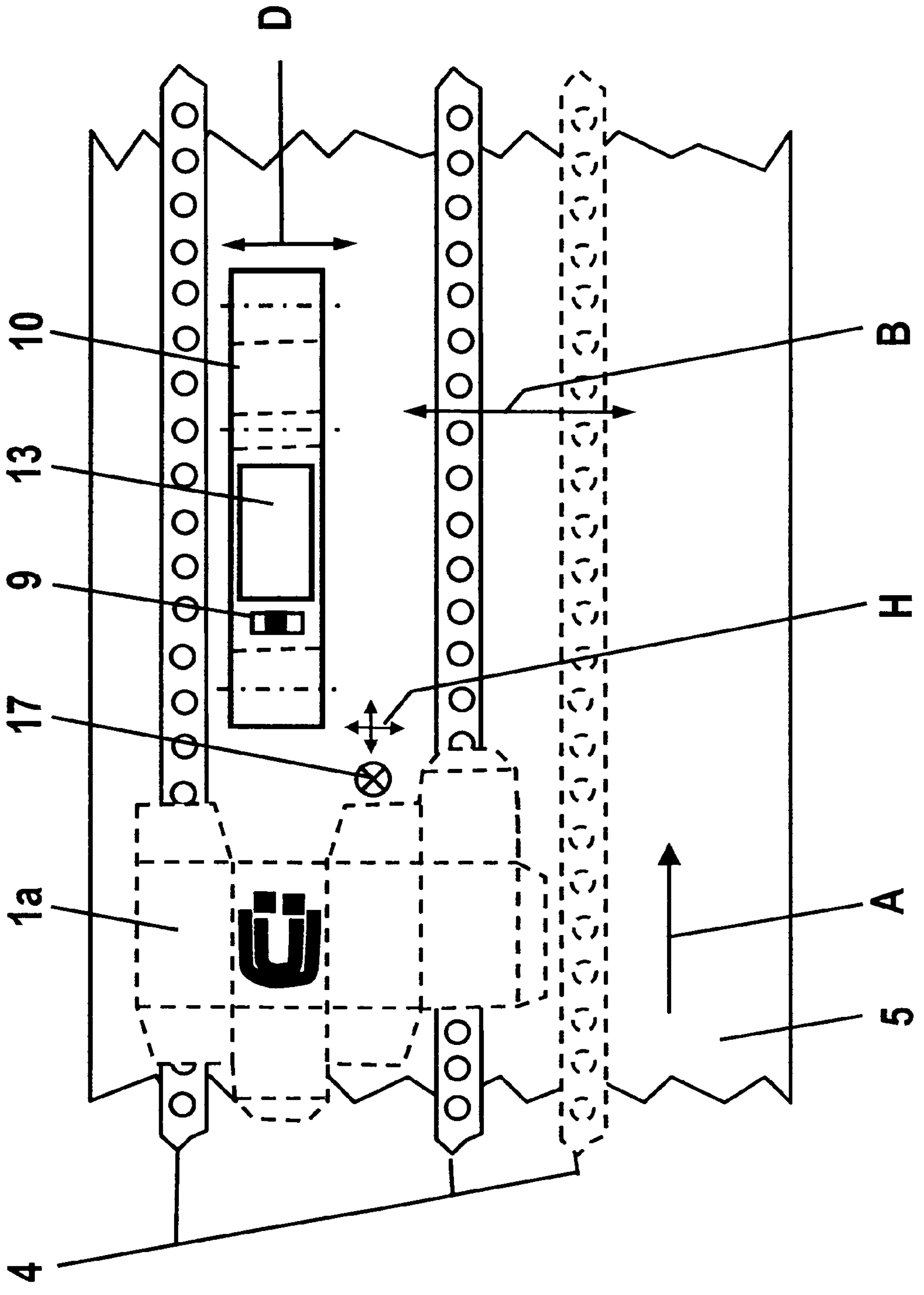
FIG. 3 shows a plan view of a layout in conjunction with the applicator.

According to FIG. 3, at least one of the conveyor belts of the conveyor device 4, 5 can be adjusted in the direction B, so that the conveyor device can be adjusted to process stock 1*a*, 1*b* of different sizes. The transfer belt 10, which can extend over only a portion of the width of the conveyor device, can be adjusted mechanically or electrically in the lateral direction D across the width of the conveyor device 4, 5 in such a way that it is ideally positioned with respect to the antenna 2 and the antenna terminal pads 3 printed on the stock 1*a*, 1*b*.

Figure 4:
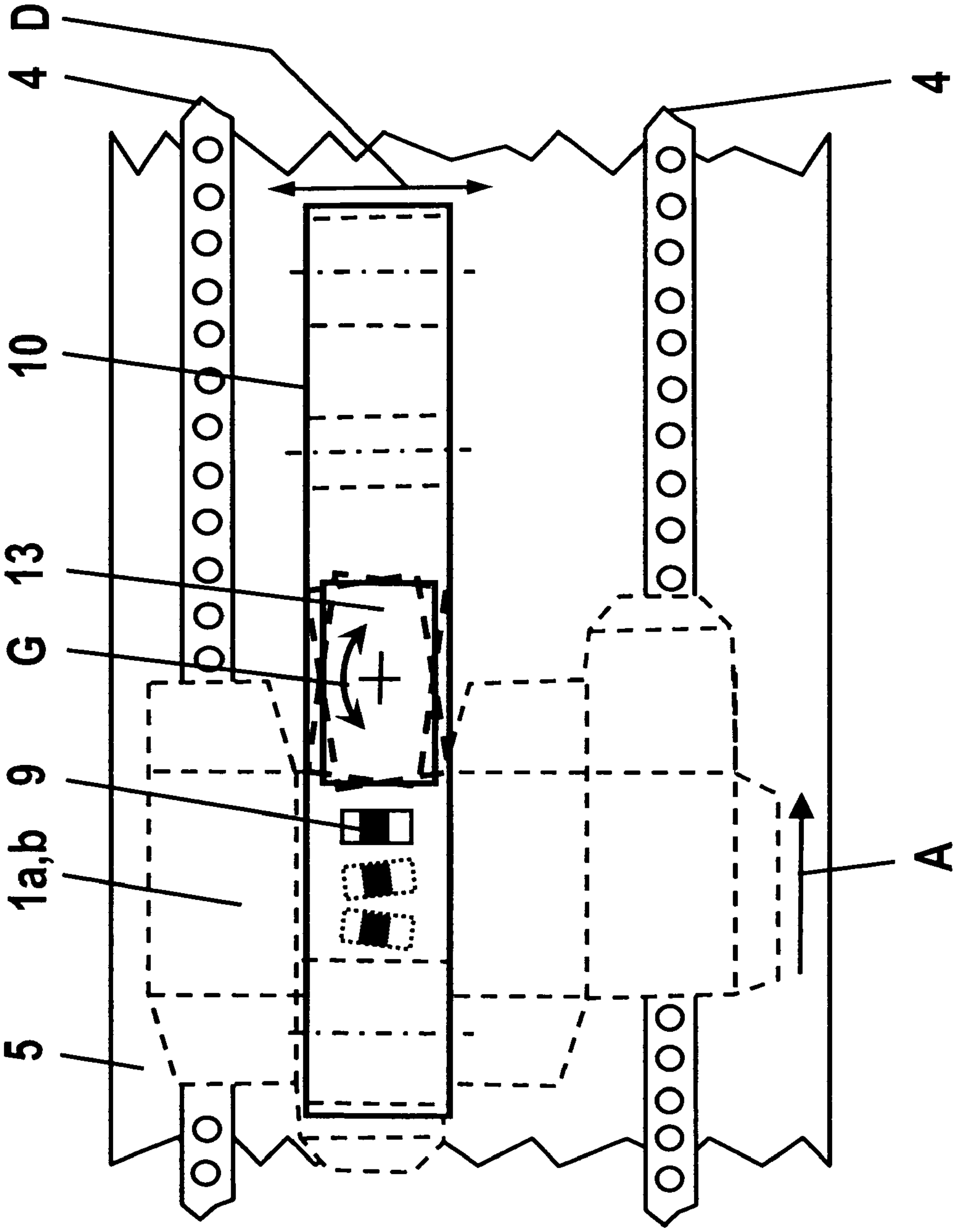
FIG. 4 shows a diagram corresponding to FIG. 3 with indication of the adjustment possibilities.

FIG. 4 shows another inventive elaboration, according to which the electronic components 9 are applied to unaligned or insufficiently aligned stock 1 on the conveyor belt. In this case, the position of the blank 1 or the position of the antenna 2 or of the antenna terminal pads 3 or other suitable measurement markers on the blank is detected at an early point by suitable measurement means such as a camera, and the orientation of the application module 13 is adjusted in direction G to allow proper placement of the electronic components 9 on the transfer belt 10. The position of the adhesive applicator device 16*b* can also be adjusted. As a result, the electronic components 9 will be applied to the antenna terminal pads 3 at the precise angle required within the narrow limits.

Finally, the finished objects, i.e., the printed stock 1*a*, 1*b* on which the circuits 2, 3 have been printed and to which the electronic components 9 have been applied, must now be delivered in orderly fashion as previously described. Here it is important to monitor the quality of the combination product consisting of stock, circuit, and component. For this purpose, an inspection device inside the output device 20 can check the finished objects for correct position and completeness of the elements. A testing device at the same location can also check the function of the circuits and components, so that defective products can be sorted out immediately.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. Apparatus for applying electronic components to a printed product, the apparatus comprising:

a conveyor device on which stock having printed circuits thereon can be conveyed in a transport direction in a transport plane;

a transfer device which can carry electronic components and transfer the electronic components to the stock on the conveyor device under pressure so that the components are accurately positioned with respect to the printed circuits, the transfer device comprising an endless transfer belt traveling around at least two guide rollers, the transfer belt having a receiving side adjacent to a feed device and a delivery side adjacent to the conveyor device, the delivery side running parallel to the transport plane so that the electronic components carried by the transfer device can be placed on stock being conveyed by the conveyor device;

a vacuum chamber configured to generate a pneumatic vacuum for holding the electronic components on the transfer belt;

a blast air chamber downstream of the vacuum chamber, the blast air chamber being arranged to direct blast air toward the belt to release the electronic components from the belt; and the feed device which can transfer said electronic components to said transfer device individually in such a way that the electronic components can be positioned on the stock by the transfer device.

2. The apparatus of claim 1 further comprising a detector for detecting the surface velocities of at least one of the transfer belt and the conveyor device, and means for synchronizing the surface velocities based on the measured values.

3. The apparatus of claim 1 wherein the blast air chamber comprises means for heating the blast air.

4. The apparatus of claim 1 further comprising at least one applicator device assigned to at least one of the transfer belt and the conveyor device for controlled application of an adhesive promoter to a respective at least one of the electronic components and the stock.

5. The apparatus of claim 4 further comprising at least one measuring device for measuring at least one of velocities and positions of at least one of the electronic components on the transfer belt and the stock on the conveyor device, the measuring device generating measurement values corresponding to said at least one of said velocities and said positions, and sending said measurement values to said at least one applicator device for applying said adhesion promoter precisely to said at least one of said electronic components and said stock.

6. The apparatus of claim 1 further comprising:

means for detecting temperatures of the transfer belt and the conveyor device where the stock is being conveyed; and means for maintaining a uniform temperature of the transfer belt and the conveyor device.

7. The apparatus of claim 1 wherein at least one of the guide rollers for the transfer belt is adjustable in a direction normal to the transport plane so that pressure exerted by the transfer belt on the stock can be adjusted.

8. The apparatus of claim 1 wherein at least one of the guide rollers for the transfer belt is adjustable in a direction parallel to the transport direction so that the length of transfer belt exerting pressure on the stock can be adjusted.

9. The apparatus of claim 1 wherein the conveyor device comprises at least one conveyor belt traveling around at least two guide rollers, and means for moving the conveyor belt transversely to the transport direction and parallel to the transport plane.

10. The apparatus of claim 1 further comprising means for moving the transfer belt transversely to the transport direction and parallel to the transport plane.

11. The apparatus of claim 1 further comprising:

a measuring device for determining the alignment of the stock on the conveyor device, and means for moving the feed device around a vertical axis normal to the transport plane, based on the determined alignment, so that the components on the transport belt are correctly oriented for placement on the printed circuits.

* * * * *